United States Patent
Yuhas et al.

(10) Patent No.: US 10,513,440 B2
(45) Date of Patent: *Dec. 24, 2019

(54) CRYSTALLINE METALLOPHOSPHATES, THEIR METHOD OF PREPARATION, AND USE

(71) Applicant: UOP LLC, Des Plaines, IL (US)

(72) Inventors: Benjamin D. Yuhas, Evanston, IL (US); Melissa M. Galey, Chicago, IL (US); Mark A. Miller, Niles, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/036,745

(22) Filed: Jul. 16, 2018

(65) Prior Publication Data
US 2019/0031521 A1    Jan. 31, 2019

Related U.S. Application Data

(60) Provisional application No. 62/538,429, filed on Jul. 28, 2017.

(51) Int. Cl.
| | |
|---|---|
| *C01B 39/54* | (2006.01) |
| *B01D 53/02* | (2006.01) |
| *B01J 20/18* | (2006.01) |
| *B01J 20/30* | (2006.01) |
| *B01J 29/85* | (2006.01) |
| *B01J 37/04* | (2006.01) |
| *B01J 37/10* | (2006.01) |
| *B01J 37/00* | (2006.01) |

(52) U.S. Cl.
CPC .............. *C01B 39/54* (2013.01); *B01D 53/02* (2013.01); *B01J 20/18* (2013.01); *B01J 20/3057* (2013.01); *B01J 20/3085* (2013.01); *B01J 29/85* (2013.01); *B01J 37/04* (2013.01); *B01J 37/10* (2013.01); *B01D 2253/116* (2013.01); *B01D 2257/406* (2013.01); *B01D 2257/504* (2013.01); *B01D 2257/702* (2013.01); *B01D 2257/80* (2013.01); *B01J 37/0018* (2013.01); *C01P 2002/72* (2013.01); *C01P 2002/74* (2013.01)

(58) Field of Classification Search
CPC ....... C01B 39/54; C01B 37/08; C01B 37/065; C01B 37/04; B01J 29/88; B01J 29/85; B01J 29/84; B01J 29/83
See application file for complete search history.

(56) References Cited

U.S. PATENT DOCUMENTS

| | | | |
|---|---|---|---|
| 4,310,440 A | 1/1982 | Wilson et al. | |
| 4,440,871 A | 4/1984 | Lok et al. | |
| 4,567,029 A | 1/1986 | Wilson et al. | |
| 4,973,785 A | 11/1990 | Lok et al. | |
| 5,126,308 A | 6/1992 | Barger et al. | |
| 8,871,178 B2 * | 10/2014 | Lewis | C01B 39/54 423/277 |
| 8,936,776 B2 * | 1/2015 | Lewis | C01B 39/54 423/277 |
| 9,522,896 B2 | 12/2016 | Nicholas et al. | |

FOREIGN PATENT DOCUMENTS

EP     2867166 B1     3/2017

OTHER PUBLICATIONS

Feng et al. (Hydrothermal syntheses and structural characterization of zeolite analogue compounds based on cobalt phosphate, Nature, 1997, vol. 388, pp. 735-740).*
Smith et al., Enumeration of 4-connected 3-dimensional nets and classification of framework silicates: the infinite set of ABC-6 nets; the Archimedian and σ-related nets; American Mineralogist, vol. 66, pp. 777-788, 1981.
Xie et al., "SSZ-52, a Zeolite with an 18-Layer Aluminosilicate Framework Structure RElated to That of the DeNOx catalyst Cu-SSZ-13", Journal of the American Chemical Society, 2013, 135, 10519-10524, 2013.
Sieber et al., "Formation and Properties of Losod, a New Sodium Zeolite", Helvetica Chimica Acta, vol. 57, Fasc. 6 pp. 1533-1549 (1974).
Wright et al., Cation-directed syntheses of novel zeolite-like metalloaluminophosphates STA-6 and STA-7 in the presence of azamacrocycle templates, J. Chem. Sc=oc., Dalton Trans., 2000, pp. 1243-1248.
Schreyeck et al., The diaza-polyoxa-macrocycle 'Kryptofix222' as a new template for the synth esis of LTA-type~AIPO4 Cotemplating role of F and/or (CH3)4N+ ions, Micorporous and Mesoporous Materials 22 (1998) 87-106.
International Search Report for International application No. PCT/US20181043429 dated Nov. 8, 2018.

* cited by examiner

*Primary Examiner* — Jafar F Parsa

(57) ABSTRACT

A new family of crystalline microporous metallophosphates designated AlPO-85 has been synthesized. These metallophosphates are represented by the empirical formula

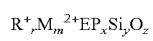

where M is a framework metal alkaline earth or transition metal of valence +2, such as magnesium or zinc, R is an organoammonium cation, and E is a trivalent framework element such as aluminum or gallium. The AlPO-85 compositions are characterized by a new unique ABC-6 net structure, and have catalytic properties suitable for carrying out various hydrocarbon conversion processes, as well as characteristics suitable for adsorption applications.

22 Claims, No Drawings

CRYSTALLINE METALLOPHOSPHATES, THEIR METHOD OF PREPARATION, AND USE

CROSS-REFERENCE TO RELATED APPLICATION

This application claims priority from Provisional Application No. 62/538,429 filed Jul. 28, 2017, the contents of which cited application are hereby incorporated by reference in its entirety.

BACKGROUND OF THE INVENTION

This invention relates to a new family of charged metallophosphate-based molecular sieves designated AlPO-85. They are represented by the empirical formula of:

$$R^+_r M^{2+}_m E P_x Si_y O_z$$

where M is a divalent framework metal such as magnesium or zinc, R is an organoammonium cation, and E is a trivalent framework element such as aluminum or gallium.

Classes of molecular sieves include crystalline aluminophosphate, silicoaluminophosphate, or metalloaluminophosphate compositions which are microporous and which are formed from corner sharing $AlO_{4/2}$ and $PO_{4/2}$ tetrahedra. In 1982, Wilson et al. first reported aluminophosphate molecular sieves, the so-called AlPOs, which are microporous materials that have many of the same properties as zeolites, although they do not contain silica (See U.S. Pat. No. 4,310,440). Subsequently, charge was introduced to the neutral aluminophosphate frameworks via the substitution of $SiO_{4/2}$ tetrahedra for $PO_{4/2}^+$ tetrahedra to produce the SAPO molecular sieves as described by Lok et al. (See U.S. Pat. No. 4,440,871). Another way to introduce framework charge to neutral aluminophosphates is to substitute $[Me^{2+}O_{4/2}]^{2-}$ tetrahedra for $AlO_{4/2}^-$ tetrahedra, which yields the MeAPO molecular sieves (see U.S. Pat. No. 4,567,029). It is furthermore possible to introduce framework charge on AlPO-based molecular sieves via the simultaneous introduction of $SiO_{4/2}$ and $[M^{2+}O_{4/2}]^{2-}$ tetrahedra to the framework, giving MeAPSO molecular sieves (See U.S. Pat. No. 4,973,785).

Numerous molecular sieves, both naturally occurring and synthetically prepared, are used in various industrial processes. Synthetically, these molecular sieves are typically prepared via hydrothermal synthesis employing suitable sources of Si, Al, P, metals, and structure directing agents such as amines or organoammonium cations. The structure directing agents reside in the pores of the molecular sieve and are largely responsible for the particular structure that is ultimately formed. These species may balance the framework charge associated with silicon or other metals such as Zn or Mg in the aluminophosphate compositions, and can also serve as space fillers to stabilize the tetrahedral network framework. Molecular sieves are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent molecular sieve crystal structure. Molecular sieves can be used as catalysts for hydrocarbon conversion reactions, which can take place on outside surfaces as well as on internal surfaces within the pore.

Applicants have synthesized a new family of charged metallophosphate framework materials that contain a +3 valence metal, such as aluminum or gallium, and additionally at least one of a +2 valence metal (such as magnesium or zinc) and silicon, designated AlPO-85. When the +3 valence metal is Al, this corresponds to SAPO, MeAPO, and MeAPSO compositions. The microporous AlPO-85 materials can be prepared with novel morpholinium-based templates as described by Nicholas et al. in U.S. Pat. No. 9,522,896. The AlPO-85 materials have a unique topology that falls in the class of structures known as ABC-6 nets (see AMERICAN MINERALOGIST, 66, 777-788 (1981)).

SUMMARY OF THE INVENTION

As stated, the present invention relates to a new family of metallophosphate molecular sieves collectively designated AlPO-85. Accordingly, one embodiment of the invention is a microporous crystalline material having a three-dimensional framework of at least $EO_{4/2}^-$ and $PO_{4/2}^+$ tetrahedral units and furthermore, at least one of $[M^{2+}O_{4/2}]^{2-}$ and $SiO_{4/2}$ tetrahedral units and an empirical composition in the as-synthesized form and anhydrous basis expressed by an empirical formula of:

$$R^+_r M^{2+}_m E P_x Si_y O_z$$

where M is at least one metal cation of valence +2 selected from the group consisting of $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, R is an organoammonium cation prepared from the reaction of an aqueous mixture of a cyclic secondary amine and an organic dihalide, "r" is the mole ratio of R to E and has a value of about 0.1 to about 2.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 1.0, "and "z" is the mole ratio of O to E and has a value determined by the equation:

$$z=(2 \cdot m + r + 3 + 5 \cdot x + 4 \cdot y)/2$$

and is characterized in that it has the x-ray diffraction pattern having at least the d-spacings and intensities set forth in Table 1:

TABLE 1

| 2-Theta | d (Å) | Intensity |
|---|---|---|
| 7.93-8.14 | 11.14-10.85 | vw-w |
| 8.51-8.83 | 10.38-10.00 | w |
| 11.60-11.88 | 7.62-7.44 | w-m |
| 13.61-13.94 | 6.50-6.35 | vw-w |
| 15.75-16.02 | 5.62-5.53 | vw-w |
| 17.08-17.36 | 5.19-5.10 | w |
| 17.96-18.24 | 4.93-4.86 | s |
| 18.83-20.07 | 4.71-4.42 | m-s |
| 20.91-21.15 | 4.24-4.20 | w-m |
| 21.94-22.29 | 4.05-3.98 | w |
| 22.61-22.88 | 3.93-3.88 | s-vs |
| 23.32-23.65 | 3.81-3.76 | m-s |
| 23.71-23.95 | 3.75-3.71 | w-m |
| 25.72-26.01 | 3.46-3.42 | w-m |
| 26.93-27.34 | 3.31-3.26 | s-vs |
| 27.45-27.74 | 3.26-3.21 | m-s |
| 29.91-30.22 | 2.98-2.95 | vw-w |
| 30.33-30.57 | 2.94-2.92 | w-m |
| 32.88-33.25 | 2.72-2.69 | m-s |
| 33.31-33.70 | 2.69-2.66 | m-s |
| 34.42-34.86 | 2.60-2.57 | w-m |

Another embodiment of the invention is a microporous crystalline material having a three-dimensional framework of at least $EO_{4/2}^-$ and $PO_{4/2}^+$ tetrahedral units, and furthermore, at least one of $[M^{2+}O_{4/2}]^{2-}$ and $SiO_{4/2}$ tetrahedral units and an empirical composition in the calcined form and anhydrous basis expressed by an empirical formula of:

$$H_w M_m^{2+} EP_x Si_y O_z$$

where M is at least one metal cation of valence +2 selected from the group consisting of, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 1.0, H is a proton, "w" is the mole ratio of H to E and varies from 0 to 2.5, and "z" is the mole ratio of O to E and has a value determined by the equation:

$$z=(w+2 \cdot m+3+5 \cdot x+4 \cdot y)/2$$

This embodiment of the invention is characterized in that it has the x-ray diffraction pattern having at least the d-spacings and intensities set forth in Table 2:

TABLE 2

| 2-Theta | d (Å) | Intensity |
|---|---|---|
| 7.81-8.03 | 11.31-11.00 | vw-w |
| 11.65-11.91 | 7.59-7.42 | s-vs |
| 13.62-13.88 | 6.49-6.37 | m-s |
| 14.06-14.36 | 6.29-6.16 | m-s |
| 17.31-17.59 | 5.12-5.04 | vw-w |
| 17.97-18.22 | 4.93-4.86 | w |
| 19.04-19.32 | 4.66-4.59 | m-s |
| 20.86-21.30 | 4.25-4.17 | vw-w |
| 22.17-22.45 | 4.00-3.96 | vw-w |
| 22.66-22.94 | 3.92-3.87 | w-m |
| 23.62-24.03 | 3.76-3.70 | w-m |
| 27.37-27.62 | 3.25-3.23 | s |
| 27.74-28.03 | 3.21-3.18 | m-s |
| 29.98-30.31 | 2.98-2.95 | vw-w |
| 30.73-31.12 | 2.91-2.87 | w-m |
| 33.13-33.45 | 2.70-2.68 | w-m |
| 33.80-34.14 | 2.65-2.62 | w-m |
| 34.82-35.43 | 2.57-2.53 | w-m |

Another embodiment of the invention is a process for preparing the crystalline microporous metallophosphate molecular sieve described above. The process comprises forming a reaction mixture containing reactive sources of R, E, P, one or both of M and Si, and heating the reaction mixture at a temperature of about 60° C. to about 200° C. for a time sufficient to form the molecular sieve, the reaction mixture having a composition expressed in terms of mole ratios of the oxides of:

$$aR_2O:bMO:E_2O_3:cP_2O_5:dSiO_2:eH_2O$$

where "a" has a value of about 0.75 to about 16, "b" has a value of about 0 to about 2, "c" has a value of about 0.5 to about 12, "d" has a value of about 0 to about 4, and "e" has a value from 30 to 750.

Yet another embodiment of the invention is an adsorption process using the crystalline AlPO-85 material. The process may involve the adsorption and desorption of organic and/or inorganic species, such as water, hydrocarbons, ammonia, methanol, or carbon dioxide. Separation of molecular species can be based either on the molecular size (kinetic diameter) or on the degree of polarity of the molecular species. Removing contaminants may be by ion exchange with the molecular sieve.

Still another embodiment of the invention is the controlled dehydration of the molecular sieve to induce topological changes suitable for a particular adsorption process. The topological changes may be reversible or irreversible.

Another further embodiment of the invention is a hydrocarbon conversion process using the above-described molecular sieve as a catalyst. The process comprises contacting at least one hydrocarbon with the molecular sieve at conversion conditions to generate at least one converted hydrocarbon.

DETAILED DESCRIPTION OF THE INVENTION

Applicants have prepared a family of metallophosphate materials whose topological structure is unique. In their paper "Enumeration of 4-connected 3-dimensional nets and classification of framework silicates: the infinite set of ABC-6 nets; the Archimedean and σ-related nets," Smith and Bennett state "To a first approximation, all silicates belonging to the ABC-6net family have x-ray diffraction patterns which can be indexed on a hexagonal prismatic unit cell with lattice parameters a~13.0±0.3 Å and c~p×(2.6±0.1 Å)." (See American Mineralogist, 66, 777-788 (1981)). This finding has subsequently been confirmed by others (see, for example, D. Xie et al. J. Am. Chem. Soc. 135, 10519 (2013)) as the ABC-6 family has expanded.

One particular composition of AlPO-85 indexes on a unit cell with hexagonal axes with lattice parameters a=13.04 Å and c=10.42 Å, which suggests an ABC-6 net structure with the stacking sequence repeating every 4 layers along the c-axis (p=10.4/2.6=4.0). In the prior art, the only known materials with 4-layer repeat units in the ABC-6 family are Losod (LOS structure), which was discovered in 1974 by Sieber and Meier (Sieber, W., Meier, W. M. Hely. Chim. Acta. 57, 1533 (1974)), and gmelinite (GME structure), a mineral zeolite. Neither the LOS nor GME zeotypes have been reported with an aluminophosphate-based composition of matter. We have furthermore found through x-ray crystallography that AlPO-85 has a unique stacking sequence from both LOS and GME. Hence the topology of the AlPO-85 family of materials is unique.

The instant microporous crystalline material AlPO-85 has an empirical composition in the as-synthesized form and on an anhydrous basis expressed by the empirical formula:

$$R^+_r M_m^{2+} EP_x Si_y O_z$$

where M is at least one framework divalent cation and is selected from the group consisting of alkaline earth and transition metals. Specific examples of the M cations include but are not limited to magnesium, cobalt (II), manganese, zinc, iron(II), nickel and mixtures thereof. R is an organoammonium cation. "r" is the mole ratio of R to E and varies from about 0.1 to about 2.0. The value of "m" is the mole ratio of M to E and varies from 0 to about 1.0, "x" is mole ratio of P to E and varies from 0.5 to about 2.0. The ratio of silicon to E is represented by "y" which varies from about 0 to about 1.0. E is a trivalent element which is tetrahedrally coordinated, is present in the framework, and is selected from the group consisting of aluminum, gallium, iron(III) and boron. Lastly, "z" is the mole ratio of O to E and is given by the equation:

$$z=(2 \cdot m+r+3+5 \cdot x+4 \cdot y)/2.$$

Synthesis of molecular sieve materials often relies on the use of organoamino o organoammonium templates known as organic structure directing agents (OSDAs). While simple OSDAs such as tetramethylammonium, tetraethylammonium and tetrapropylammonium are commercially available, oftentimes OSDAs are complicated molecules that are difficult and expensive to synthesize. However, their importance lies in their ability to impart aspects of their structural features to the molecular sieve to yield a desirable pore structure. For example, the use of 1,4,7,10,13,16-hexamethyl-1,4,7,10,13,16-hexaazacyclooctadecane as OSDA has been shown to allow synthesis of STA-7, an aluminophosphate based material of the SAV zeotype (Wright et.al. J. CHEM. SOC., Dalton Trans., 2000, 1243-1248); the use of 4,7,13,16,21,24-hexaoxa-1,10-diazabicyclo[8.8.8]hexacosane ('Kryptofix 222') led to the synthesis of $AlPO_4$-42 (Schreyeck et.al. MICRO.MESO.MATER. 1998, 22, 87-106); MAPO-35, a magnesium aluminophosphate material with the LEV topology, is disclosed in U.S. Pat. No. 4,567,029 in which quinuclidine is employed as a structure directing agent; and in U.S. Pat. No. 4,973,785, the MeAPSO composition CoAPSO-35 is disclosed, which contains both cobalt and silicon in the framework in addition to Al and P and uses methylquinuclidine as the structure directing agent.

The art clearly shows that use of complex organoammonium SDAs often results in new molecular sieve materials. However, the synthesis of these complicated organoammonium compounds is quite lengthy and requires many steps, often in an organic solvent, thereby hindering development of the new molecular sieve material. Frequently, even for simple, commercially available OSDAs, the OSDA is the most costly ingredient used in synthesizing molecular sieve materials. Consequently, it would be economically advantageous to synthesize new molecular sieves from either commercially available organoammonium SDAs or SDAs which may be readily synthesized from commercially available starting materials. This has recently been demonstrated in an elegant fashion using simple aqueous chemistry to generate a novel family of organo-1-oxa-4-azonium cyclohexane compounds (U.S. Pat. No. 9,522,896), derived from morpholine-based compounds. This procedure thereby allows the preparation of SDAs, such as unusual quaternary ammonium salts, from readily available starting reagents in a facile and practical manner. OSDAs prepared by the methods of the present invention are in aqueous solution and do not pose odor and flashpoint concerns. The result is the unprecedented ability to remove the cooling step typically required in the preparation of in-situ zeolite reaction mixtures and to avoid purification steps such as evaporation of organic solvent typically required in ex-situ preparation methods. The obtained organoammonium bromide salt can be ion-exchanged, either by reaction with $Ag_2O$ or by anion exchange resins to yield the hydroxide form of the organoammonium compound, or used as the halogen salt directly. Finally, the resultant organoammonium compound can be used for the synthesis of a zeolite or molecular sieve.

The microporous crystalline metallophosphate AlPO-85 is prepared by a hydrothermal crystallization of a reaction mixture prepared by combining reactive sources of R, E, phosphorus, and one or both of M and silicon. A preferred form of the AlPO-85 materials is when E is Al. The sources of aluminum include but are not limited to aluminum alkoxides, precipitated aluminas, aluminum metal, aluminum hydroxide, aluminum salts and alumina sols. Specific examples of aluminum alkoxides include, but are not limited to aluminum ortho sec-butoxide and aluminum ortho isopropoxide. Sources of phosphorus include, but are not limited to, orthophosphoric acid, phosphorus pentoxide, and ammonium dihydrogen phosphate. Sources of silica include but are not limited to tetraethylorthosilicate, colloidal silica, and precipitated silica. Sources of the other E elements include but are not limited to organoammonium borates, boric acid, precipitated gallium oxyhydroxide, gallium sulfate, ferric sulfate, and ferric chloride. Sources of the M metals include the halide salts, nitrate salts, acetate salts, and sulfate salts of the respective alkaline earth and transition metals. R is an organoammonium cation prepared from the reaction of an aqueous mixture of a cyclic secondary amine and an organic dihalide. Specific examples of cyclic secondary amines include, without limitation, piperidine, homopiperidine, pyrrolidine, and morpholine. Specific examples of organic dihalides include, without limitation, 1,4-dibromobutane, 1,5-dibromopentane, and 1,6-dibromohexane.

In one embodiment, the cyclic secondary amine is morpholine and the organic dihalide is 1,4-dibromobutane.

In another embodiment, the cyclic secondary amine is morpholine and the organic dihalide is 1,4-dibromopentane.

In another embodiment, the cyclic secondary amine is morpholine and the organic dihalide is 1,5-dibromopentane.

In another embodiment, the cyclic secondary amine is a non-N-substituted morpholine and the organic dihalide is 1,4-dibromobutane. Non-N-substituted morpholines include, but are not limited to, 2-methylmorpholine, 3-methylmorpholine, 2,3-dimethylmorpholine, 2,5-dimethylmorpholine, 2,6-dimethylmorpholine, 2,2-dimethylmorpholine, and 3,3-dimethylmorpholine.

The reaction mixture containing reactive sources of the desired components can be described in terms of molar ratios of the oxides by the formula:

$$aR_2O:bMO:E_2O_3:cP_2O_5:dSiO_2:eH_2O$$

where "a" has a value of about 0.75 to about 16, "b" has a value of about 0 to about 2, "c" has a value of about 0.5 to about 12, "d" has a value of about 0 to about 4, and "e" has a value from 30 to 750. If alkoxides are used, it is preferred to include a distillation or evaporative step to remove the alcohol hydrolysis products.

The reaction mixture is reacted at a temperature of about 60° C. to about 200° C. and preferably from about 125° C. to about 175° C. for a period of about 1 day to about 21 days and preferably for a time of about 2 days to about 10 days in a sealed reaction vessel at autogenous pressure. The reaction vessel may be heated with stirring, heated while tumbling, or heated quiescently. After crystallization is complete, the solid product is isolated from the heterogeneous mixture by means such as filtration or centrifugation, and then washed with deionized water and dried in air at ambient temperature up to about 100° C. AlPO-85 seeds can optionally be added to the reaction mixture in order to accelerate the formation of the desired microporous composition.

The AlPO-85 material, which is obtained from the above-described process, is characterized by the x-ray following diffraction pattern, having at least the d-spacings and relative intensities set forth in Table 3:

TABLE 3

| 2-Theta | d (Å) | Intensity |
|---|---|---|
| 7.93-8.14 | 11.14-10.85 | vw-w |
| 8.51-8.83 | 10.38-10.00 | w |
| 11.60-11.88 | 7.62-7.44 | w-m |
| 13.61-13.94 | 6.50-6.35 | vw-w |
| 15.75-16.02 | 5.62-5.53 | vw-w |
| 17.08-17.36 | 5.19-5.10 | w |
| 17.96-18.24 | 4.93-4.86 | s |
| 18.83-20.07 | 4.71-4.42 | m-s |
| 20.91-21.15 | 4.24-4.20 | w-m |

TABLE 3-continued

| 2-Theta | d (Å) | Intensity |
|---|---|---|
| 21.94-22.29 | 4.05-3.98 | w |
| 22.61-22.88 | 3.93-3.88 | s-vs |
| 23.32-23.65 | 3.81-3.76 | m-s |
| 23.71-23.95 | 3.75-3.71 | w-m |
| 25.72-26.01 | 3.46-3.42 | w-m |
| 26.93-27.34 | 3.31-3.26 | s-vs |
| 27.45-27.74 | 3.26-3.21 | m-s |
| 29.91-30.22 | 2.98-2.95 | vw-w |
| 30.33-30.57 | 2.94-2.92 | w-m |
| 32.88-33.25 | 2.72-2.69 | m-s |
| 33.31-33.70 | 2.69-2.66 | m-s |
| 34.42-34.86 | 2.60-2.57 | w-m |

The AlPO-85 material may be calcined in either air or nitrogen to remove the occluded template. In one embodiment of the invention, the AlPO-85 is calcined at a temperature of at least 550° C. In another embodiment of the invention, the AlPO-85 is calcined at a temperature of at least 600° C. The AlPO-85 is thermally stable upon calcination, and may be characterized by the x-ray diffraction pattern, having at least the d-spacings and relative intensities set forth in Table 4 below:

TABLE 4

| 2-Theta | d (Å) | Intensity |
|---|---|---|
| 7.81-8.03 | 11.31-11.00 | vw-w |
| 11.65-11.91 | 7.59-7.42 | s-vs |
| 13.62-13.88 | 6.49-6.37 | m-s |
| 14.06-14.36 | 6.29-6.16 | m-s |
| 17.31-17.59 | 5.12-5.04 | vw-w |
| 17.97-18.22 | 4.93-4.86 | w |
| 19.04-19.32 | 4.66-4.59 | m-s |
| 20.86-21.30 | 4.25-4.17 | vw-w |
| 22.17-22.45 | 4.00-3.96 | vw-w |
| 22.66-22.94 | 3.92-3.87 | w-m |
| 23.62-24.03 | 3.76-3.70 | w-m |
| 27.37-27.62 | 3.25-3.23 | s |
| 27.74-28.03 | 3.21-3.18 | m-s |
| 29.98-30.31 | 2.98-2.95 | vw-w |
| 30.73-31.12 | 2.91-2.87 | w-m |
| 33.13-33.45 | 2.70-2.68 | w-m |
| 33.80-34.14 | 2.65-2.62 | w-m |
| 34.82-35.43 | 2.57-2.53 | w-m |

The stable calcined AlPO-85 material can be characterized on an anhydrous basis by the empirical formula:

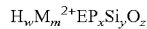

$$H_w M_m^{2+} E P_x Si_y O_z$$

where M is at least one metal cation of valence +2 selected from the group consisting of, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, H is a proton, "w" is the mole ratio of H to E and has a value of about 0 to about 2.5, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 1.0, and "z" is the mole ratio of O to E and has a value determined by the equation:

$$z=(2+2\cdot m+3+5\cdot x+4\cdot y)/2$$

The crystalline AlPO-85 materials of this invention can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species.

The AlPO-85 compositions of this invention can also be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process. Specific reaction conditions and the types of feeds which can be used in these processes are set forth in U.S. Pat. Nos. 4,310,440, 4,440,871 and 5,126,308, which are incorporated by reference.

The adsorptive properties of the AlPO-85 material can be controlled by the manner in which they are dehydrated. As such, one embodiment of the invention is the process in which the AlPO-85 is dehydrated, which gives the desired adsorption characteristics.

The following examples are presented in illustration of this invention and are not intended as undue limitations on the generally broad scope of the invention as set out in the appended claims. The products will be designated with names that contain the suffix "-85" to indicate the "-85" structure and prefix that reflects the compositional nature of the product, such as "SAPO" for a silicoaluminophosphate, "ZnAPO" for a zinc aluminophosphate, and "MgAPSO" for a magnesium silicoaluminophosphate, etc.

The structure of the AlPO-85 compositions of this invention was determined by x-ray analysis. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, w, and vw which represent very strong, strong, medium, weak, and very weak respectively. In terms of $100 \times I/I_o$, the above designations are defined as:

$$vw = 0-5; \ w = 5-15; \ m = 15-40; \ s = 40-75 \text{ and } vs = 75'100$$

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLE 1

591.2 g of water was weighed into a 2L Teflon bottle. 436.2 g of 1,4-dibromobutane (99%) was added. To this mixture, 352.0 g of morpholine (99%) was added under magnetic stirring. The water and morpholine combined to form a cloudy phase while the denser 1,4-dibromobutane remained on the bottom. The Teflon bottle was placed under an overheard mixer and stirred somewhat vigorously. After 15-20 minutes a clear light yellow template solution is formed. 197.1 g water was then added to make the final solution 50% water by weight.

EXAMPLE 2

1000.0 g of the solution from Example 1 was contacted with 304.6 g of $Ag_2O$ in a round-bottom flask, which combined to form a grey opaque solution. The flask was placed under a high speed overheard stirrer for stirring at room temperature for 1 day. The sample was filtered to remove the precipitated silver bromide and the final solution was sent for water analysis, which showed that the sample was composed of 67.9% water.

EXAMPLE 3

105.0 g of the product of Example 2 was combined with 7.52 g of alumina trihydrate. 1.42 g of Ludox AS-40 (Sigma-Aldrich) was added to the gel followed by 29.14 g of 85% (w/w) phosphoric acid. Following this step, 4.84 g of a 28.3% (w/w) magnesium acetate solution was added to the gel. The gel was then stirred vigorously for 2 hours. The final gel mixture was transferred into a 300cc stirred autoclave and slowly heated to 100° C. The mixture was held at 100° C. for 24 hours, and then it was slowly heated to 160° C., where it was held for 3 days. Afterwards, the gel was cooled to room temperature, the products were isolated by centrifugation, and the solids dried at 100° C. overnight. X-ray diffraction analysis of the solids revealed the following lines:

| 2-Theta | d (Å) | Intensity |
|---|---|---|
| 8.024 | 11.0095 | vw |
| 8.683 | 10.1755 | w |
| 11.757 | 7.5212 | m |
| 13.776 | 6.4228 | w |
| 15.891 | 5.5723 | vw |
| 17.225 | 5.1438 | w |
| 18.066 | 4.9061 | s |
| 18.981 | 4.6718 | m |
| 21.036 | 4.2198 | w |
| 22.016 | 4.034 | w |
| 22.733 | 3.9085 | s |
| 23.49 | 3.7842 | m |
| 23.832 | 3.7306 | m |
| 25.81 | 3.449 | w |
| 27.043 | 3.2945 | vs |
| 27.161 | 3.2805 | vs |
| 27.602 | 3.2291 | m |
| 30.035 | 2.9728 | w |
| 30.434 | 2.9347 | m |
| 33.069 | 2.7067 | m |
| 33.146 | 2.7005 | m |
| 33.43 | 2.6783 | m |
| 33.565 | 2.6678 | m |
| 34.586 | 2.5914 | m |
| 34.743 | 2.58 | w |

This product was identified by XRD as MgSAPO-85. Elemental analysis gave a stoichiometry of $Mg_{0.142}Si_{0.153}AlP_{1.106}$.

EXAMPLE 4

The product of Example 3 was calcined in air at 600° C. in a muffle furnace. The furnace was ramped at 2° C./min to the target temperature. After calcination for 4 hours at 600° C., the sample was cooled to room temperature. XRD analysis of the calcined material revealed the following lines:

| 2-Theta | d (Å) | Intensity |
|---|---|---|
| 7.926 | 11.1452 | w |
| 11.784 | 7.5039 | vs |
| 13.742 | 6.4387 | s |
| 14.205 | 6.2298 | s |
| 17.451 | 5.0778 | vw |
| 18.133 | 4.8883 | w |
| 19.178 | 4.6243 | s |
| 21.034 | 4.2202 | vw |
| 22.295 | 3.9842 | vw |
| 22.81 | 3.8954 | m |
| 23.74 | 3.745 | m |
| 23.89 | 3.7218 | m |
| 27.497 | 3.2411 | s |
| 27.858 | 3.1999 | m |
| 30.119 | 2.9647 | vw |
| 30.875 | 2.8938 | w |
| 33.249 | 2.6924 | m |
| 33.924 | 2.6404 | w |
| 34.955 | 2.5648 | w |
| 35.22 | 2.5461 | w |
| 43.007 | 2.1014 | vw |

This product was identified by XRD as MgSAPO-85. The surface area of the calcined MgSAPO-85 (measured by nitrogen adsorption at 77 K) was determined to be 276 $m^2/g$, and the micropore volume was determined to be 0.12 $cm^3/g$. McBain adsorption experiments on the calcined MgSAPO-85 revealed the following uptake behavior:

| Molecule | Pressure (torr) | Wt. % Uptake |
|---|---|---|
| $H_2O$ | 4.6 | 22.3 |
| $CO_2$ | 250 | 3.5 |
| $n-C_4H_{10}$ | 700 | 0.1 |

EXAMPLE 5

105.0 g of the product of Example 2 was combined with 11.28 g of alumina trihydrate. 1.42 g of Ludox AS-40 (Sigma-Aldrich) was added to the gel followed by 29.14 g of 85% (w/w) phosphoric acid. Following this step, 4.84 g of a 28.3% (w/w) magnesium acetate solution was added to the gel. The gel was then stirred vigorously for 2 hours. The final gel mixture was transferred into a 300 cc stirred autoclave and slowly heated to 100° C. The mixture was held at 100° C. for 24 hours, and then it was slowly heated to 160° C., where it was held for 3 days. Afterwards, the gel was cooled to room temperature, the products were isolated by centrifugation, and the solids dried at 100° C. overnight. The product was identified by XRD as MgSAPO-85 with a trace amount of gibbsite.

EXAMPLE 6

826 g of water was weighed into a 2L Teflon bottle. 474.1 g of 1,5-dibromopentane (99%) was added. To this mixture, 352.0 g of morpholine (99%) was added under magnetic stirring. The water and morpholine combined to form a cloudy phase while the denser 1,5-dibromopentane remained on the bottom. The Teflon bottle was then placed in a metal beaker with water in it under an overhead mixer and stirred somewhat vigorously. The mixture is heated moderately (~40-50° C.) to drive the reaction forward.

EXAMPLE 7

1150.0 g of the solution from Example 6 was contacted with 336.4 g of $Ag_2O$ in a round-bottom flask, which combined to form a grey opaque solution. The flask was placed under a high speed overhead stirrer for stirring at room temperature for 1 day. The sample was filtered to remove the precipitated silver bromide and the final solution was sent for water analysis, which showed that the sample was composed of 65.7% water.

EXAMPLE 8

81.52 g of the product of Example 7 was combined with 9.12 g of aluminum hydroxide. 0.81 g of Ludox AS-40 (Sigma-Aldrich) was added to the gel followed by 23.55 g of 85% (w/w) phosphoric acid. Following this step, 4.74 g of a 28.3% (w/w) magnesium acetate solution was added to the gel. The gel was then stirred vigorously for 2 hours. The final gel mixture was transferred into four 45 cc autoclaves which are placed in a rotisserie oven at 15 rpm and slowly heated to 100° C. The mixture was held at 100° C. for 24 hours, and then it was slowly heated to 160° C., where it was held for 4 days. Afterwards, the resulting products were cooled to room temperature and isolated by centrifugation, and the solids dried at 100° C. overnight. Elemental analysis of this material gave a stoichiometry of $Mg_{0.318}Si_{0.040}AlP_{1.370}$. This product was identified by XRD as MgSAPO-85.

EXAMPLE 9

105.0 g of the product of Example 2 was combined with 9.30 g of aluminum hydroxide. 1.42 g of Ludox AS-40 (Sigma-Aldrich) was added to the gel followed by 29.14 g of 85% (w/w) phosphoric acid. Following this step, 4.84 g of a 28.3% (w/w) magnesium acetate solution was added to the gel. The gel was then stirred vigorously for 2 hours. The final gel mixture was transferred equally between two 125 cc autoclaves and digested statically at 160° for 3 days. Afterwards, the resulting products were cooled to room temperature and isolated by centrifugation, the solids were dried at 100° C. overnight. Elemental analysis of the material gave a stoichiometry of $Mg_{0.276}Si_{0.059}AlP_{1.245}$. This product was identified by XRD as MgSAPO-85.

Specific Embodiments

While the following is described in conjunction with specific embodiments, it will be understood that this description is intended to illustrate and not limit the scope of the preceding description and the appended claims.

A first embodiment of the invention is a microporous crystalline material having a three-dimensional framework of at least $O4/2-$ and $PO4/2+$ tetrahedral units and furthermore, at least one of $[M2+O4/2]2-$ and $SiO4/2$ tetrahedral units and an empirical composition in the as-synthesized form and anhydrous basis expressed by an empirical formula of $R+rMm2+EPxSiyOz$ where M is at least one metal cation of valence +2 selected from the group consisting of $Mg2+$, $Zn2+$, $Co2+$, $Mn2+$, $Fe2+$, $Ni2+$, "m" is the mole ratio of M to E and varies from 0 to about 1.0, R is an organoammonium cation prepared from the reaction of an aqueous mixture of a cyclic secondary amine and an organic dihalide, "r" is the mole ratio of R to E and has a value of about 0.1 to about 2.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 1.0, "and "z" is the mole ratio of O to E and has a value determined by the equation $z=(2·m+r+3+5·x+4·y)/2$ and is characterized in that it has the x-ray diffraction pattern having at least the d-spacings and intensities set forth in Table 1.

TABLE 1

| 2-Theta | d (Å) | Intensity |
|---|---|---|
| 7.93-8.14 | 11.14-10.85 | vw-w |
| 8.51-8.83 | 10.38-10.00 | w |
| 11.60-11.88 | 7.62-7.44 | w-m |
| 13.61-13.94 | 6.50-6.35 | vw-w |
| 15.75-16.02 | 5.62-5.53 | vw-w |
| 17.08-17.36 | 5.19-5.10 | w |
| 17.96-18.24 | 4.93-4.86 | s |
| 18.83-20.07 | 4.71-4.42 | m-s |
| 20.91-21.15 | 4.24-4.20 | w-m |
| 21.94-22.29 | 4.05-3.98 | w |
| 22.61-22.88 | 3.93-3.88 | s-vs |
| 23.32-23.65 | 3.81-3.76 | m-s |
| 23.71-23.95 | 3.75-3.71 | w-m |
| 25.72-26.01 | 3.46-3.42 | w-m |
| 26.93-27.34 | 3.31-3.26 | s-vs |
| 27.45-27.74 | 3.26-3.21 | m-s |
| 29.91-30.22 | 2.98-2.95 | vw-w |
| 30.33-30.57 | 2.94-2.92 | w-m |
| 32.88-33.25 | 2.72-2.69 | m-s |
| 33.31-33.70 | 2.69-2.66 | m-s |
| 34.42-34.86 | 2.60-2.57 | w-m |

An embodiment of the invention is one, any or all prior embodiments in this paragraph up through the embodiment in this paragraph wherein the microporous crystalline material in a calcined form comprises a three-dimensional framework of at least $EO_{4/2}-$ and $PO_{4/2}^+$ tetrahedral units, and furthermore, at least one of $[M^{2+}O_{4/2}]^{2-}$ and $SiO_{4/2}$ tetrahedral units and an empirical composition in the calcined form and anhydrous basis expressed by an empirical formula of $H_wM_m^{2+}EP_xSi_yO_z$ where M is at least one metal cation of valence +2 selected from the group consisting of, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 1.0, "w" is the mole ratio of H to E and varies from 0 to 2.5, and "z" is the mole ratio of O to E and has a value determined by the equation $z=(w+2·m+3+5·x+4·y)/2$ and characterized in that it has the x-ray diffraction pattern having at least the d-spacings and intensities set forth in Table 2.

TABLE 2

| 2-Theta | d (Å) | Intensity |
|---|---|---|
| 7.81-8.03 | 11.31-11.00 | vw-w |
| 11.65-11.91 | 7.59-7.42 | s-vs |
| 13.62-13.88 | 6.49-6.37 | m-s |
| 14.06-14.36 | 6.29-6.16 | m-s |
| 17.31-17.59 | 5.12-5.04 | vw-w |
| 17.97-18.22 | 4.93-4.86 | w |
| 19.04-19.32 | 4.66-4.59 | m-s |
| 20.86-21.30 | 4.25-4.17 | vw-w |
| 22.17-22.45 | 4.00-3.96 | vw-w |
| 22.66-22.94 | 3.92-3.87 | w-m |
| 23.62-24.03 | 3.76-3.70 | w-m |
| 27.37-27.62 | 3.25-3.23 | s |
| 27.74-28.03 | 3.21-3.18 | m-s |
| 29.98-30.31 | 2.98-2.95 | vw-w |
| 30.73-31.12 | 2.91-2.87 | w-m |
| 33.13-33.45 | 2.70-2.68 | w-m |
| 33.80-34.14 | 2.65-2.62 | w-m |
| 34.82-35.43 | 2.57-2.53 | w-m |

A second embodiment of the invention is a method of making a microporous crystalline material comprising forming a reaction mixture prepared by combining reactive sources of R, E, phosphorus, and one or both of M and silicon in a molar ratio of $aR_2O\ bMO\ E_2O_3\ cP_2O_5\ dSiO_2\ eH_2O$ where "a" has a value of about 0.75 to about 16, "b" has a value of about 0 to about 2, "c" has a value of about 0.5 to about 12, "d" has a value of about 0 to about 4, and "e" has a value from 30 to 750 reacting the reaction mixture at a temperature from about 60° C. to about 200° C. for a period of about 1 day to about 21 days, isolating a solid product wherein the microporous crystalline material is characterized by the x-ray following diffraction pattern, having at least the d-spacings and relative intensities set forth in Table 3.

TABLE 3

| 2-Theta | d (Å) | Intensity |
|---|---|---|
| 7.93-8.14 | 11.14-10.85 | vw-w |
| 8.51-8.83 | 10.38-10.00 | w |
| 11.60-11.88 | 7.62-7.44 | w-m |
| 13.61-13.94 | 6.50-6.35 | vw-w |
| 15.75-16.02 | 5.62-5.53 | vw-w |
| 17.08-17.36 | 5.19-5.10 | w |
| 17.96-18.24 | 4.93-4.86 | s |
| 18.83-20.07 | 4.71-4.42 | m-s |
| 20.91-21.15 | 4.24-4.20 | w-m |
| 21.94-22.29 | 4.05-3.98 | w |
| 22.61-22.88 | 3.93-3.88 | s-vs |
| 23.32-23.65 | 3.81-3.76 | m-s |
| 23.71-23.95 | 3.75-3.71 | w-m |
| 25.72-26.01 | 3.46-3.42 | w-m |
| 26.93-27.34 | 3.31-3.26 | s-vs |
| 27.45-27.74 | 3.26-3.21 | m-s |
| 29.91-30.22 | 2.98-2.95 | vw-w |
| 30.33-30.57 | 2.94-2.92 | w-m |
| 32.88-33.25 | 2.72-2.69 | m-s |
| 33.31-33.70 | 2.69-2.66 | m-s |
| 34.42-34.86 | 2.60-2.57 | w-m |

An embodiment of the invention is one, any or all of prior embodiments in this paragraph up through the first embodiment in this paragraph further comprising calcining the microporous crystalline material at a temperature of at least 550° C. to produce a calcined microporous crystalline material characterized by the x-ray diffraction pattern, having at least the d-spacings and relative intensities set forth in Table 4 below:

TABLE 4

| 2-Theta | d (Å) | Intensity |
|---|---|---|
| 7.81-8.03 | 11.31-11.00 | vw-w |
| 11.65-11.91 | 7.59-7.42 | s-vs |
| 13.62-13.88 | 6.49-6.37 | m-s |
| 14.06-14.36 | 6.29-6.16 | m-s |
| 17.31-17.59 | 5.12-5.04 | vw-w |
| 17.97-18.22 | 4.93-4.86 | w |
| 19.04-19.32 | 4.66-4.59 | m-s |
| 20.86-21.30 | 4.25-4.17 | vw-w |
| 22.17-22.45 | 4.00-3.96 | vw-w |
| 22.66-22.94 | 3.92-3.87 | w-m |
| 23.62-24.03 | 3.76-3.70 | w-m |
| 27.37-27.62 | 3.25-3.23 | s |
| 27.74-28.03 | 3.21-3.18 | m-s |
| 29.98-30.31 | 2.98-2.95 | vw-w |
| 30.73-31.12 | 2.91-2.87 | w-m |
| 33.13-33.45 | 2.70-2.68 | w-m |
| 33.80-34.14 | 2.65-2.62 | w-m |
| 34.82-35.43 | 2.57-2.53 | w-m |

An embodiment of the invention is one, any or all of prior embodiments in this paragraph up through the first embodiment in this paragraph wherein E is aluminum. An embodiment of the invention is one, any or all prior embodiments in this paragraph up through the first embodiment in this paragraph wherein a source of aluminum is selected from the group consisting of aluminum alkoxides, precipitated aluminas, aluminum metal, aluminum hydroxide, aluminum salts and alumina sols. An embodiment of the invention is one, any or all of prior embodiments in this paragraph up through the first embodiment in this paragraph wherein a source of phosphorus is selected from the group consisting of orthophosphoric acid, phosphorus pentoxide, and ammonium dihydrogen phosphate. An embodiment of the invention is one, any or all of prior embodiments in this paragraph up through the first embodiment in this paragraph wherein sources of silica are selected from the group consisting of tetraethylorthosilicate, colloidal silica, and precipitated silica. An embodiment of the invention is one, any or all of prior embodiments in this paragraph up through the first embodiment in this paragraph wherein the sources of other E elements are selected from the group consisting of organoammonium borates, boric acid, precipitated gallium oxyhydroxide, gallium sulfate, ferric sulfate, and ferric chloride. An embodiment of the invention is one, any or all of prior embodiments in this paragraph up through the first embodiment in this paragraph wherein sources of the M metals are selected from the group consisting of halide salts, nitrate salts, acetate salts, and sulfate salts of the respective alkaline earth and transition metals. An embodiment of the invention is one, any or all of prior embodiments in this paragraph up through the first embodiment in this paragraph wherein R is an organoammonium cation prepared from a reaction of an aqueous mixture of a cyclic secondary amine and an organic dihalide. An embodiment of the invention is one, any or all of prior embodiments in this paragraph up through the first embodiment in this paragraph wherein the cyclic secondary amines are selected from the group consisting of piperidine, homopiperidine, pyrrolidine, and morpholine. An embodiment of the invention is one, any or all prior embodiments in this paragraph up through the first embodiment in this paragraph wherein the organic dihalides are selected from the group consisting of 1,4-dibromobutane, 1,5-dibromopentane, and 1,6-dibromohexane. An embodiment of the invention is one, any or all of prior embodiments in this paragraph up through the first embodiment in this paragraph wherein the reaction mixture is reacted at a temperature from about 125° C. to about 175° C.

A third embodiment of the invention is a process of separating a mixture of molecular species comprising contacting the mixture with crystalline AlPO-85 materials comprising a three-dimensional framework of at least $EO_{4/2}^-$ and $PO_{4/2}^+$ tetrahedral units, and furthermore, at least one of $[M^{2+}O_{4/2}]^{2-}$ and $SiO_{4/2}$ tetrahedral units and an empirical composition in the calcined form and anhydrous basis expressed by an empirical formula of $H_wM_m^{2+}EP_xSi_yO_z$ where M is at least one metal cation of valence +2 selected from the group consisting of, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 1.0, H is a proton, "w" is the mole ratio of H to E and varies from 0 to 2.5, and "z" is the mole ratio of O to E and has a value determined by the equation $z=(w+2\cdot m+3+5\cdot x+4\cdot y)/2$ and characterized in that it has the x-ray diffraction pattern having at least the d-spacings and intensities set forth in Table 2.

TABLE 2

| 2-Theta | d (Å) | Intensity |
|---|---|---|
| 7.81-8.03 | 11.31-11.00 | vw-w |
| 11.65-11.91 | 7.59-7.42 | s-vs |
| 13.62-13.88 | 6.49-6.37 | m-s |
| 14.06-14.36 | 6.29-6.16 | m-s |
| 17.31-17.59 | 5.12-5.04 | vw-w |
| 17.97-18.22 | 4.93-4.86 | w |
| 19.04-19.32 | 4.66-4.59 | m-s |
| 20.86-21.30 | 4.25-4.17 | vw-w |
| 22.17-22.45 | 4.00-3.96 | vw-w |
| 22.66-22.94 | 3.92-3.87 | w-m |
| 23.62-24.03 | 3.76-3.70 | w-m |
| 27.37-27.62 | 3.25-3.23 | s |
| 27.74-28.03 | 3.21-3.18 | m-s |
| 29.98-30.31 | 2.98-2.95 | vw-w |
| 30.73-31.12 | 2.91-2.87 | w-m |
| 33.13-33.45 | 2.70-2.68 | w-m |
| 33.80-34.14 | 2.65-2.62 | w-m |
| 34.82-35.43 | 2.57-2.53 | w-m |

An embodiment of the invention is one, any or all prior embodiments in this paragraph up through the embodiment in this paragraph wherein the separation of molecular species is based on molecular size (kinetic diameter) or on a degree of polarity of the molecular species. A hydrocarbon conversion process comprising contacting a hydrocarbon stream with crystalline AlPO-85 materials comprising a three-dimensional framework of at least $EO_{4/2}^-$ and $PO_{4/2}^+$ tetrahedral units, and furthermore, at least one of $[M^{2+}O_{4/2}]^{2-}$ and $SiO_{4/2}$ tetrahedral units and an empirical composition in the calcined form and anhydrous basis expressed by an empirical formula of $H_wM_m^{2+}EP_xSi_yO_z$ where M is at least one metal cation of valence +2 selected from the group consisting of, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 1.0, H is a proton, "w" is the mole ratio of H to E and varies from 0 to 2.5, and "z" is the mole ratio of O to E and has a value determined by the equation $z=(w+2\cdot m+3+5\cdot x+4\cdot y)/2$ and characterized in that it has the x-ray diffraction pattern having at least the d-spacings and intensities set forth in Table 2.

TABLE 2

| 2-Theta | d (Å) | Intensity |
|---|---|---|
| 7.81-8.03 | 11.31-11.00 | vw-w |
| 11.65-11.91 | 7.59-7.42 | s-vs |
| 13.62-13.88 | 6.49-6.37 | m-s |
| 14.06-14.36 | 6.29-6.16 | m-s |
| 17.31-17.59 | 5.12-5.04 | vw-w |
| 17.97-18.22 | 4.93-4.86 | w |
| 19.04-19.32 | 4.66-4.59 | m-s |
| 20.86-21.30 | 4.25-4.17 | vw-w |
| 22.17-22.45 | 4.00-3.96 | vw-w |
| 22.66-22.94 | 3.92-3.87 | w-m |
| 23.62-24.03 | 3.76-3.70 | w-m |
| 27.37-27.62 | 3.25-3.23 | s |
| 27.74-28.03 | 3.21-3.18 | m-s |
| 29.98-30.31 | 2.98-2.95 | vw-w |
| 30.73-31.12 | 2.91-2.87 | w-m |
| 33.13-33.45 | 2.70-2.68 | w-m |
| 33.80-34.14 | 2.65-2.62 | w-m |
| 34.82-35.43 | 2.57-2.53 | w-m |

An embodiment of the invention is one, any or all of prior embodiments in this paragraph up through the second embodiment in this paragraph wherein the hydrocarbon conversion process is selected from the group consisting of cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and a synthesis gas shift process.

The invention claimed is:

1. A microporous crystalline material having a three-dimensional framework of at least $EO_{4/2}^-$ and $PO_{4/2}^+$ tetrahedral units and furthermore, at least one of $[M^{2+}O_{4/2}]^{2-}$ and $SiO_{4/2}$ tetrahedral units and an empirical composition in the as-synthesized form and anhydrous basis expressed by an empirical formula of:

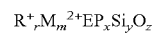

$$R^+_rM_m^{2+}EP_xSi_yO_z$$

where M is at least one metal cation of valence +2 selected from the group consisting of $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, R is an organoammonium cation prepared from the reaction of an aqueous mixture of a cyclic secondary amine and an organic dihalide, "r" is the mole ratio of R to E and has a value of about 0.1 to about 2.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 1.0, "and "z" is the mole ratio of O to E and has a value determined by the equation:

$$z=(2\cdot m+r+3+5\cdot x+4\cdot y)/2$$

and is characterized in that it has the x-ray diffraction pattern having at least the d-spacings and intensities set forth in Table 1:

TABLE 1

| 2-Theta | d (Å) | Intensity |
| --- | --- | --- |
| 7.93-8.14 | 11.14-10.85 | vw-w |
| 8.51-8.83 | 10.38-10.00 | w |
| 11.60-11.88 | 7.62-7.44 | w-m |
| 13.61-13.94 | 6.50-6.35 | vw-w |
| 15.75-16.02 | 5.62-5.53 | vw-w |
| 17.08-17.36 | 5.19-5.10 | w |
| 17.96-18.24 | 4.93-4.86 | s |
| 18.83-20.07 | 4.71-4.42 | m-s |
| 20.91-21.15 | 4.24-4.20 | w-m |
| 21.94-22.29 | 4.05-3.98 | w |
| 22.61-22.88 | 3.93-3.88 | s-vs |
| 23.32-23.65 | 3.81-3.76 | m-s |
| 23.71-23.95 | 3.75-3.71 | w-m |
| 25.72-26.01 | 3.46-3.42 | w-m |
| 26.93-27.34 | 3.31-3.26 | s-vs |
| 27.45-27.74 | 3.26-3.21 | m-s |
| 29.91-30.22 | 2.98-2.95 | vw-w |
| 30.33-30.57 | 2.94-2.92 | w-m |
| 32.88-33.25 | 2.72-2.69 | m-s |
| 33.31-33.70 | 2.69-2.66 | m-s |
| 34.42-34.86 | 2.60-2.57 | w-m. |

2. The microporous crystalline material of claim 1 in calcined form comprising a three-dimensional framework of at least $EO_{4/2}^-$ and $PO_{4/2}^+$ tetrahedral units, and furthermore, at least one of $[M^{2+}O_{4/2}]^{2-}$ and $SiO_{4/2}$ tetrahedral units and an empirical composition in the calcined form and anhydrous basis expressed by an empirical formula of:

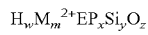

$$H_w M_m^{2+} E P_x Si_y O_z$$

where M is at least one metal cation of valence +2 selected from the group consisting of, $Mg^{2+}, Zn^{2+}, Co^{2+}, Mn^{2+}, Fe^{2+}, Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 1.0, H is a proton, "w" is the mole ratio of H to E and varies from 0 to 2.5, and "z" is the mole ratio of O to E and has a value determined by the equation:

$$z=(w+2 \cdot m+3+5 \cdot x+4 \cdot y)/2$$

and characterized in that it has the x-ray diffraction pattern having at least the d-spacings and intensities set forth in Table 2:

TABLE 2

| 2-Theta | d (Å) | Intensity |
| --- | --- | --- |
| 7.81-8.03 | 11.31-11.00 | vw-w |
| 11.65-11.91 | 7.59-7.42 | s-vs |
| 13.62-13.88 | 6.49-6.37 | m-s |
| 14.06-14.36 | 6.29-6.16 | m-s |
| 17.31-17.59 | 5.12-5.04 | vw-w |
| 17.97-18.22 | 4.93-4.86 | w |
| 19.04-19.32 | 4.66-4.59 | m-s |
| 20.86-21.30 | 4.25-4.17 | vw-w |
| 22.17-22.45 | 4.00-3.96 | vw-w |
| 22.66-22.94 | 3.92-3.87 | w-m |
| 23.62-24.03 | 3.76-3.70 | w-m |
| 27.37-27.62 | 3.25-3.23 | s |
| 27.74-28.03 | 3.21-3.18 | m-s |
| 29.98-30.31 | 2.98-2.95 | vw-w |
| 30.73-31.12 | 2.91-2.87 | w-m |
| 33.13-33.45 | 2.70-2.68 | w-m |
| 33.80-34.14 | 2.65-2.62 | w-m |
| 34.82-35.43 | 2.57-2.53 | w-m. |

3. The microporous crystalline material of claim 1 wherein E is aluminum.

4. The microporous crystalline material of claim 3 wherein the aluminum is obtained from a source selected from aluminum alkoxides, precipitated aluminas, aluminum metal, aluminum hydroxide, aluminum salts and alumina sols.

5. The microporous crystalline material of claim 1 wherein the phosphorus is obtained from a source selected from orthophosphoric acid, phosphorus pentoxide, and ammonium dihydrogen phosphate.

6. The microporous crystalline material of claim 1 wherein the silica is obtained from a source selected from tetraethylorthosilicate, colloidal silica, and precipitated silica.

7. The microporous crystalline material of claim 1 wherein E is obtained from a source selected from organo-ammonium borates, boric acid, precipitated gallium oxyhydroxide, gallium sulfate, ferric sulfate, and ferric chloride.

8. The microporous crystalline material of claim 1 wherein M is obtained from a source selected from halide salts, nitrate salts, acetate salts, and sulfate salts of the respective alkaline earth and transition metals.

9. The microporous crystalline material of claim 1 wherein R is an organoammonium cation prepared from a reaction of an aqueous mixture of a cyclic secondary amine and an organic dihalide.

10. The microporous crystalline material of claim 9 wherein the cyclic secondary amine is selected from piperidine, homopiperidine, pyrrolidine, and morpholine.

11. The microporous crystalline material of claim 9 wherein the organic dihalide is selected from 1,4-dibromobutane, 1,5-dibromopentane, and 1,6-dibromohexane.

12. The microporous crystalline material of claim 1 wherein M is magnesium.

13. The microporous crystalline material of claim 2 wherein E is aluminum.

14. The microporous crystalline material of claim 13 wherein the aluminum is obtained from a source selected from aluminum alkoxides, precipitated aluminas, aluminum metal, aluminum hydroxide, aluminum salts and alumina sols.

15. The microporous crystalline material of claim 2 wherein the phosphorus is obtained from a source selected from orthophosphoric acid, phosphorus pentoxide, and ammonium dihydrogen phosphate.

16. The microporous crystalline material of claim 2 wherein the silica is obtained from a source selected from tetraethylorthosilicate, colloidal silica, and precipitated silica.

17. The microporous crystalline material of claim 2 wherein E is obtained from a source selected from organo-ammonium borates, boric acid, precipitated gallium oxyhydroxide, gallium sulfate, ferric sulfate, and ferric chloride.

18. The microporous crystalline material of claim 2 wherein M is obtained from a source selected from halide salts, nitrate salts, acetate salts, and sulfate salts of the respective alkaline earth and transition metals.

19. The microporous crystalline material of claim 2 wherein R is an organoammonium cation prepared from a reaction of an aqueous mixture of a cyclic secondary amine and an organic dihalide.

20. The microporous crystalline material of claim 19 wherein the cyclic secondary amine is selected from piperidine, homopiperidine, pyrrolidine, and morpholine.

21. The microporous crystalline material of claim 19 wherein the organic dihalide is selected from 1,4-dibromobutane, 1,5-dibromopentane, and 1,6-dibromohexane.

22. The microporous crystalline material of claim 2 wherein M is magnesium.

\* \* \* \* \*